United States Patent
Smith (10) Patent No.: US 10,336,191 B2
(45) Date of Patent: Jul. 2, 2019

(54) VEHICLE TACHOMETER DISPLAY

(71) Applicant: Ford Global Technologies, LLC, Dearborn, MI (US)

(72) Inventor: Joshua Scott Smith, Allen Park, MI (US)

(73) Assignee: FORD GLOBAL TECHNOLOGIES, LLC, Dearborn, MI (US)

(\*) Notice: Subject to any disclaimer, the term of this patent is extended or adjusted under 35 U.S.C. 154(b) by 111 days.

(21) Appl. No.: 15/381,445

(22) Filed: Dec. 16, 2016

(65) Prior Publication Data
US 2018/0170180 A1  Jun. 21, 2018

(51) Int. Cl.
*B60K 35/00* (2006.01)
*B60W 50/14* (2012.01)
*B60W 30/19* (2012.01)
*F16H 63/50* (2006.01)

(52) U.S. Cl.
CPC ...... *B60K 35/00* (2013.01); *B60K 2350/1072* (2013.01); *B60K 2350/1076* (2013.01); *B60K 2350/206* (2013.01); *B60K 2350/2008* (2013.01); *B60K 2350/962* (2013.01); *B60W 30/19* (2013.01); *B60W 50/14* (2013.01); *F16H 63/502* (2013.01); *Y10T 477/679* (2015.01)

(58) Field of Classification Search
CPC ... Y10T 477/679; B60W 30/19; B60W 50/14; F16H 63/50; F16H 63/502; B60K 35/00; B60K 2350/2008; B60K 2350/1072; B60K 2350/1076

USPC .......................................................... 701/64
See application file for complete search history.

(56) References Cited

U.S. PATENT DOCUMENTS

| | | | |
|---|---|---|---|
| 4,179,933 A | 12/1979 | Schramm | |
| 4,179,938 A | 12/1979 | Schramm | |
| 4,947,681 A | 8/1990 | Young | |
| 6,625,562 B2 | 9/2003 | Hayashi | |
| 6,781,512 B2 * | 8/2004 | Hayashi | B60K 35/00 340/439 |
| 7,522,034 B1 | 4/2009 | Price | |
| 7,675,404 B2 * | 3/2010 | Kanzaka | B60K 35/00 180/171 |

(Continued)

FOREIGN PATENT DOCUMENTS

| | | |
|---|---|---|
| DE | 19605342 A1 | 8/1996 |
| GB | 201405 A | 8/1923 |

(Continued)

*Primary Examiner* — Roger L Pang
(74) *Attorney, Agent, or Firm* — David R. Stevens; Stevens Law Group (57) ABSTRACT

A vehicle controller determines likelihood of downshifting, such as by detecting braking and clutch disengagement. In response, the vehicle controller determines a desired angular velocity for the engine for a gear lower than a current gear. A tachometer display is updated to indicate the current angular velocity of the engine and the desired angular velocity. A difference between current and desired angular velocities is determined and fill in a region of the tachometer display, such as a sector between needles indicating current and desired angular velocities or most or all of a surface of the tachometer. The tachometer may be updated in the same manner according to a desired angular velocity in cases where the drive shifts into gear following coasting in neutral.

18 Claims, 6 Drawing Sheets

(56) References Cited

U.S. PATENT DOCUMENTS

2005/0280521 A1* 12/2005 Mizumaki .............. B60K 35/00
                                                    340/438
2015/0217684 A1*  8/2015 Frens .................... G01D 11/28
                                                    362/23.14
2015/0367732 A1  12/2015 Becker
2017/0120750 A1*  5/2017 Romani ............ B60W 50/0097

FOREIGN PATENT DOCUMENTS

GB           229038 A    2/1925
JP          2006153556   6/2006
WO    WO 2008/081220    7/2008

* cited by examiner

VEHICLE TACHOMETER DISPLAY

BACKGROUND

Field of the Invention

This invention relates to systems and methods for implementing a tachometer display for a vehicle with a manual transmission.

Background of the Invention

Downshifting a manual vehicle may be performed more smoothly when using the "heel and toe" downshifting technique. Using this technique, a driver presses the accelerator with the heel of the right foot while braking with the toes of the right foot with the clutch depressed. The accelerator is pressed in order to match the engine speed to the lower gear such that sudden deceleration of the tires is reduced, thereby improving stability of the vehicle.

For beginners and experienced drivers in an unfamiliar vehicle, it can be difficult to determine what engine angular velocity, e.g. revolutions per minute (RPM), to achieve prior to letting out the clutch pedal.

The system and methods disclosed herein provide an improved approach for enabling a driver to perform "heel and toe" downshifting.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
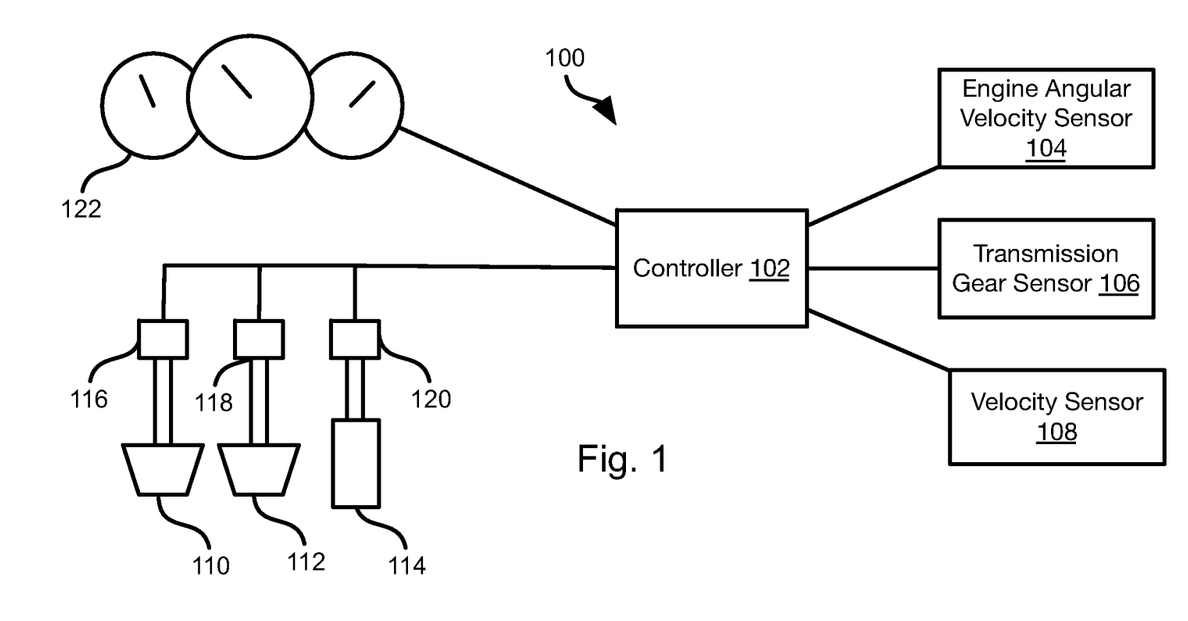
FIG. 1 is a schematic diagram of components of a vehicle for implementing a tachometer display in accordance with an embodiment of the present invention.

Referring to FIG. 1, a vehicle 100 may house a controller 102. The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

The controller 102 may be operably coupled to sensors for detecting a state of the drive train of the vehicle 100, such as an engine angular velocity sensor 104, a transmission gear sensor 106, and a vehicle velocity sensor 108.

The vehicle may further include a clutch pedal 110, brake pedal 112, and accelerator pedal 114. A clutch pedal position sensor 116, brake pedal position sensor 118, and accelerator pedal position sensor 120 detect the positions of the pedals 110, 112, 114. The sensors 116-120 may be coupled to the controller 102. Alternatively, the sensors 116-120 may be replaced with sensors that directly detect the state of the clutch, brake, and throttle, respectively.

The controller 102 may further be coupled to an instrument cluster 122 that displays sensed values received by the controller from the sensors 104, 108 and other sensors. In particular, the instrument cluster 122 may include a tachometer that displays an indicator of the output of the engine angular velocity sensor 104.

Figure 2:
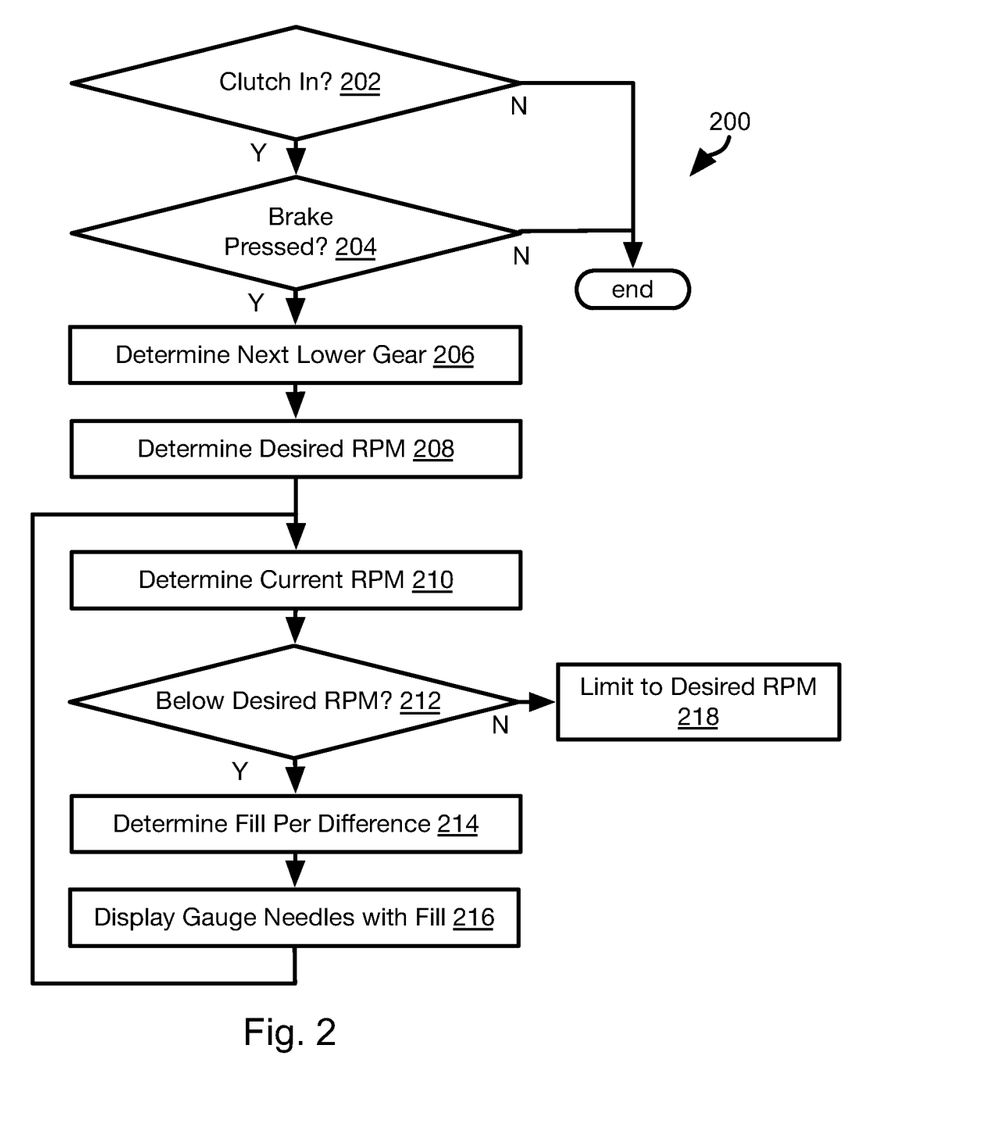
FIG. 2 is a process flow diagram of a method for rendering a tachometer display in accordance with an embodiment of the present invention.

Referring to FIG. 2, the illustrated method 200 may be executed by the controller 102 in order to render or otherwise alter representation of an engine velocity on a tachometer display. The method 200 may include evaluating 202 whether the clutch pedal is depressed, i.e. the engine is disengaged from the manual transmission, this may include evaluating an output of the clutch pedal position sensor 116 or another sensor that measures a state of the clutch.

The method may further include evaluating 204 whether the driver is applying the brake, such as by evaluating whether an output of the brake pedal position sensor 118 indicates displacement thereof by the driver. In some embodiments, step 204 may include evaluating 204 whether the vehicle is slowing due to the driver not pressing the accelerator or some other cause.

If the result of both of steps 202 and 204 are positive, some or all of the remaining steps of the method 200 may be executed. If the result of either one of steps 202 and 204 is not positive, the method 200 may end. The method 200 may be executed periodically, such as at a same rate as the sampling rate of the controller 102 of outputs of the sensors 116, 118.

Where the result of both steps 202 and 204 is positive, method 200 may further include determining 206 a next lower gear. In particular, the method 200 contemplates helping a driver to more smoothly downshift. Accordingly, in response to positive results from steps 202 and 204, a downshift may be determined to be likely. The output of the transmission gear sensor 106 may be evaluated to determine a current gear of the transmission. The lower gear may be determined to be the gear lower than the current gear, e.g. if the vehicle is currently in third gear, the lower gear will be second gear.

The method 200 may include determining 208 a desired angular velocity of the engine for the lower gear. In particular, for a given vehicle velocity V, a transmission gear ratio $R_1$, an engine angular velocity $W_1$, and where R2 is the gear ratio of the lower gear from step 206, the engine angular velocity will need to change to $W_2=(R_1/R_2)*W1$, in order to maintain the same velocity V. In this example, vehicle velocity V is proportional to R1*W1 and R2*W2. The value of $W_2$ may therefore be used as the desired engine angular velocity. If the clutch is reengaged with the transmission in the lower gear at the same engine angular velocity, a sudden deceleration of the road wheels will occur, which could result in a loss of control during cornering.

The method 200 may include determining 210 a current angular velocity of the engine, such as from the output of the engine angular velocity sensor 104 and evaluating 212 whether the current angular velocity is below the desired angular velocity of step 208.

If so, then a fill may be determined 214 according to the difference between the desired angular velocity and the current angular velocity. Determining 214 the fill may include determining a color, brightness, texture, pattern, or other visual attribute. For example, the fill may transition from red to green with decrease in the difference.

The method 200 may then include displaying 216 needles in the tachometer display according to the current angular velocity and the desired angular velocity. Step 216 may include displaying a fill on the tachometer display according to the fill selected at step 214.

Figure 3A:
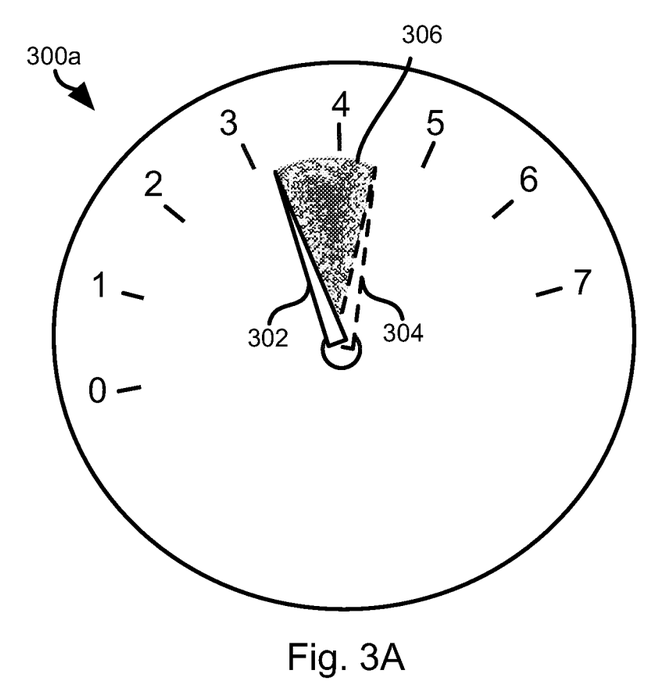
FIGS. 3A to 3B are illustrate example tachometer displays in accordance with an embodiment of the present invention.

For example, referring to FIG. 3A, the illustrated tachometer display 300*a* may include a needle 302 indicating the current angular velocity, a needle 304 indicating the desired angular velocity, and a fill region 306 having the fill determined at step 214. As is apparent, the fill region 306 is the sector between the needles 302, 304 in the illustrated embodiment. As is apparent in FIG. 3A, the needles 302, 304 may be visually distinguished from one another, such as by color, brightness, shape, length, or other visual attribute.

Figure 3B:
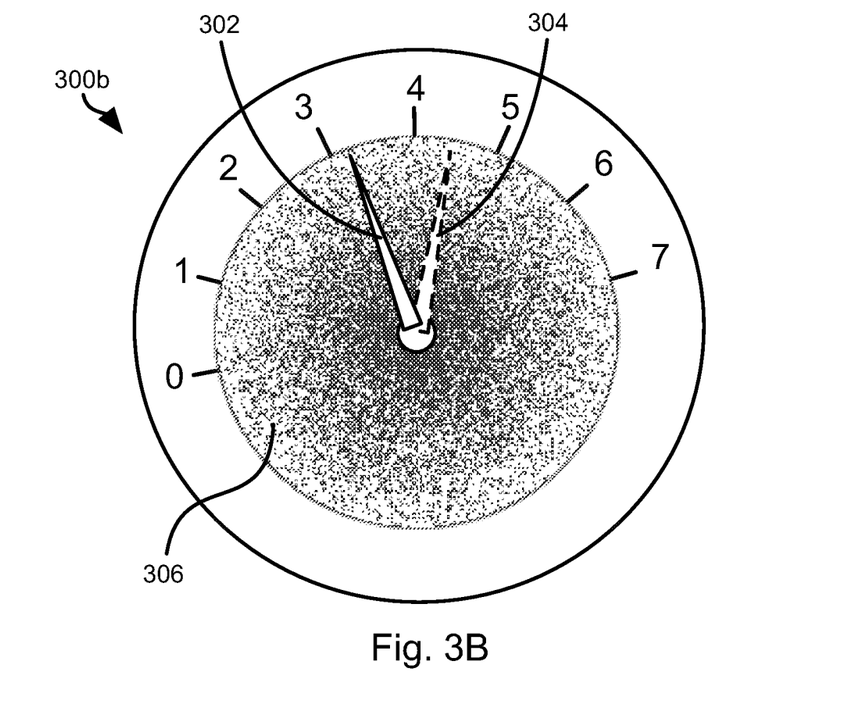

Referring to FIG. 3B, in another embodiment of a tachometer display 300*b*, the fill region 306 may occupy a region around the needles 302, 304, in addition to the sector between the needles 302, 304. For example, in the case of a tachometer display embodied as a dial, an entire face of the dial, a major portion of the face of the dial (e.g. between 50 and 90 percent) may have the fill as determined at step 214. Filling a major portion of the face enables a user to immediately determine whether increasing of engine speed is needed without having to focus on the needles 302, 304 of the tachometer display. This is particularly helpful in high-speed operation when the driver may be able to devote limited attention to the tachometer.

In some embodiments, the tachometer displays 300*a*, 300*b* are implemented by a digital display, e.g. an LED, LCD, OLED, or other type of screen. In other embodiments, the needles 302, 304 are physical needles actuated to positions corresponding to the current and desired angular velocities respectively. In such embodiments, the fill region 306 may be controlled by varying the intensities of one or more light sources. For example, the dial may be illuminated by green and red LEDs, with the relative intensities of the green and red LEDs being varied according to the difference between the current and desired angular velocities. The needles 302, 304 may be aligned with one another in instances where display of a desired angular velocity is not needed according to the method 200.

Referring again to FIG. 2, step 210 may be repeated periodically, such that the fill may vary as the difference between current and desired angular velocity changes. For example, the fill may transition from red to green as the current angular velocity increases to become closer to the desired angular velocity. In some embodiments, if the current angular velocity is determined 212 not to be below the desired angular velocity, the method 200 may end. In others, the controller 102 may temporarily limit 218 the angular velocity of the engine to be no higher than, or within some tolerance of the desired angular velocity. For example, the limit may be imposed for from 0.5 to 2 seconds, or some other time interval. The limit may be imposed for some time interval, e.g. 0.5 to 2 seconds following engagement of the lower gear as indicated by the transmission gear sensor 106.

Figure 4:
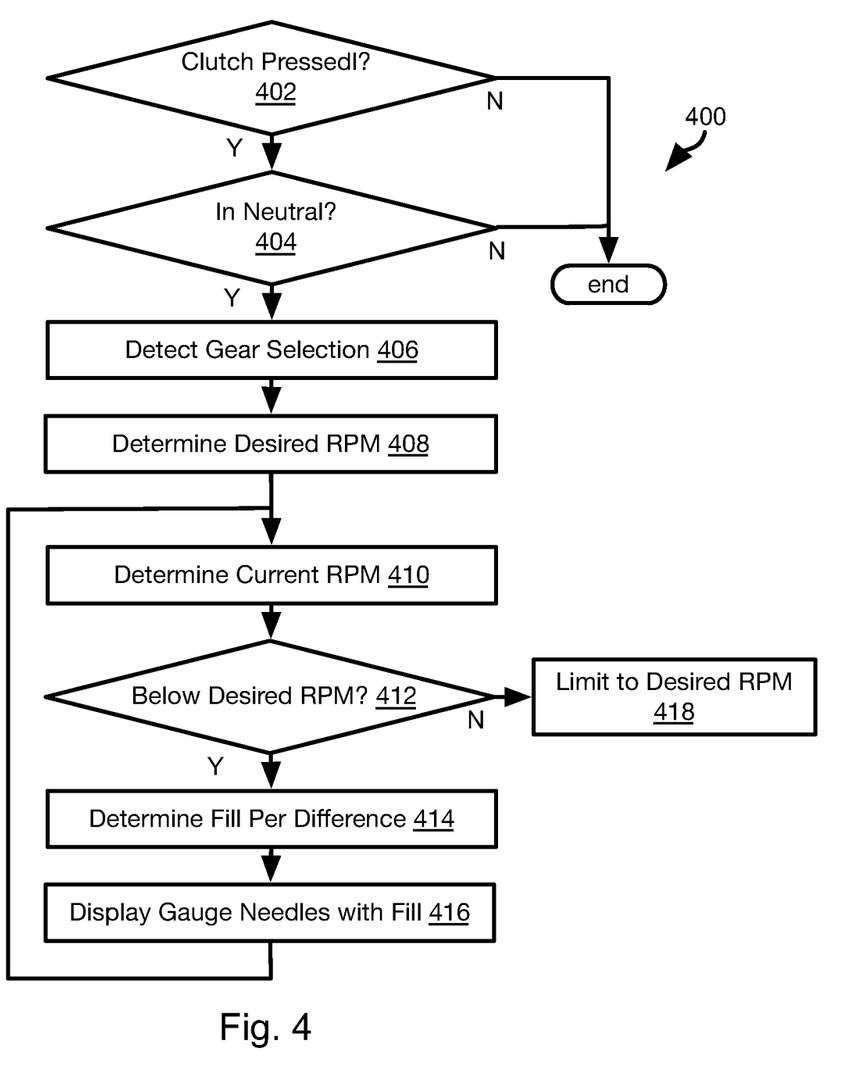
FIG. 4 is a process flow diagram of another method for rendering a tachometer display in accordance with an embodiment of the present invention.

Referring to FIG. 4, on some embodiments the controller 102 may be additionally or alternatively programmed to execute the illustrated method 400. The method 400 illustrates a scenario where a driver is permitting a vehicle to coast and then reengages the engine with the road wheels.

The method 400 may include evaluating 402 whether the clutch has been pressed, i.e. the engine disengaged from the transmission and determine 404 whether at the time the clutch was determined 402 to be pressed, the transmission was in neutral. If the result of steps 402 and 404 are positive, then the method 400 may include detecting 406 selection of a gear and determining 408 a desired angular velocity of the engine for that gear. As before, this may include selecting an angular velocity such that for the current road wheel velocity and the gear ratio of the selected gear, the desired angular velocity will be matched the current road wheel velocity and not result in a deceleration of the vehicle.

Steps 410-418 may then be executed using the desired angular velocity in the same manner as for the method 200 in order to control the fill for the fill region 306 in the tachometer display and display of the needle 306 indicating the desired angular velocity.

Figure 5:
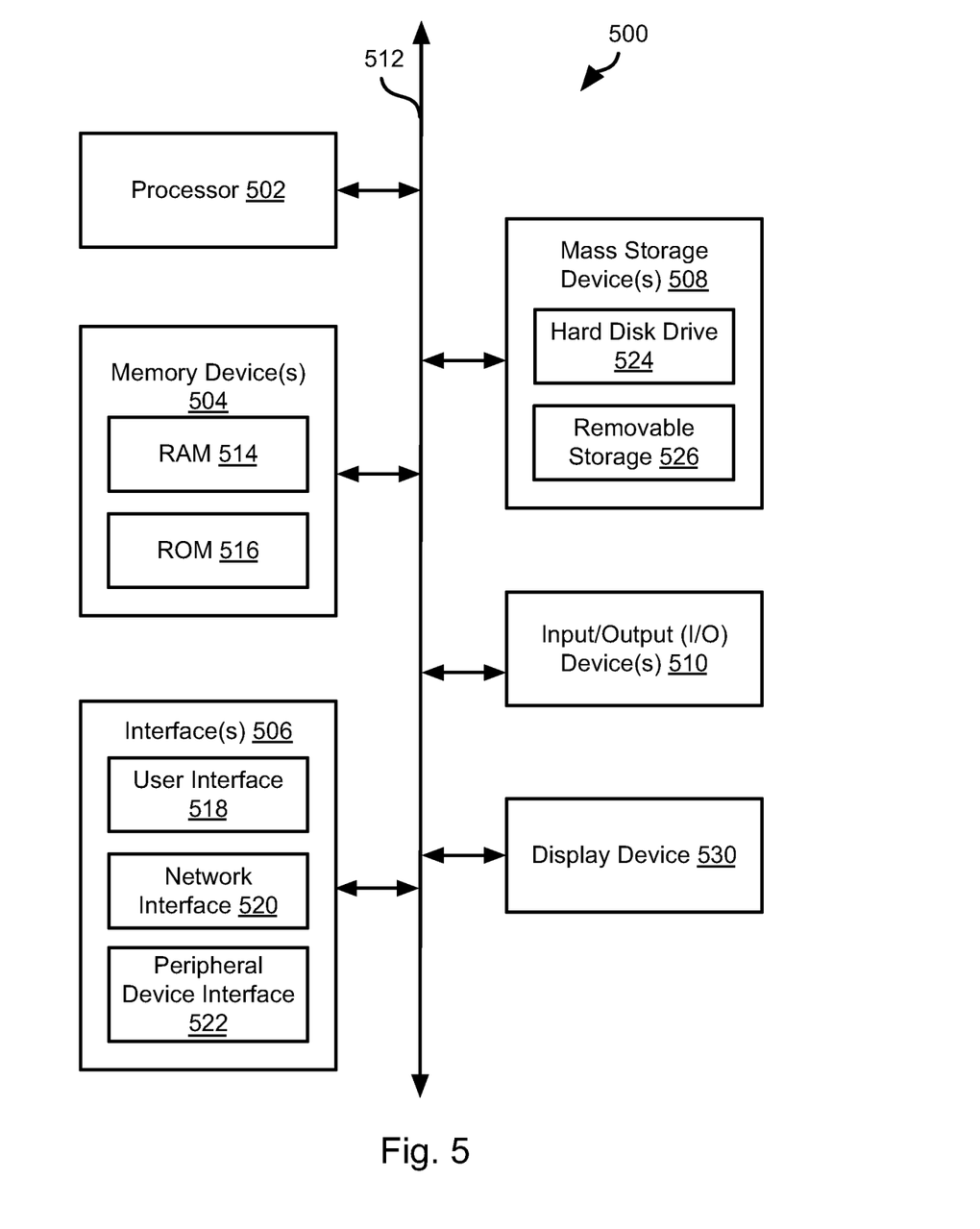
FIG. 5 is a schematic block diagram of a computer system capable of implementing the methods disclosed herein.

FIG. 5 is a block diagram illustrating an example computing device 500. Computing device 500 may be used to perform various procedures, such as those discussed herein. The controller 102 and the tachometer displays 300*a*, 300*b* may have some or all of the attributes of the computing device 500.

Computing device 500 includes one or more processor(s) 502, one or more memory device(s) 504, one or more interface(s) 506, one or more mass storage device(s) 508, one or more Input/Output (I/O) device(s) 510, and a display device 530 all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Display device 530 includes any type of device capable of displaying information to one or more users of computing device 500. Examples of display device 530 include a monitor, display terminal, video projection device, and the like. As noted above, the tachometer may be embodied as a display device.

Interface(s) 506 include various interfaces that allow computing device 500 to interact with other systems, devices, or computing environments. Example interface(s) 506 include any number of different network interfaces 520, such as interfaces to local area networks (LANs), wide area networks (WANs), wireless networks, and the Internet. Other interface(s) include user interface 518 and peripheral device interface 522. The interface(s) 506 may also include one or more peripheral interfaces such as interfaces for printers, pointing devices (mice, track pad, etc.), keyboards, and the like.

Bus 512 allows processor(s) 502, memory device(s) 504, interface(s) 506, mass storage device(s) 508, I/O device(s) 510, and display device 530 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising, by a controller of a vehicle including an engine:
   detecting that a downshift of a manual transmission of the vehicle is likely; and
   displaying, on a tachometer—
      a first indicator of a current angular velocity of the engine;
      a second indicator of a desired angular velocity;
      a filled region having a fill corresponding to a difference between the current angular velocity and the desired angular velocity; and
      determining a color for the filled region according to the difference between the current angular velocity and the desired angular velocity.

2. The method of claim 1, further comprising calculating the desired angular velocity of the engine for a lower gear below a current gear of the manual transmission based on a velocity of the vehicle.

3. The method of claim 1, wherein detecting that the downshift of the manual transmission of the vehicle is likely comprises:
   detecting (a) disengagement of the clutch while the manual transmission is in neutral and (b) selection of a selected gear of the manual transmission such that the desired angular velocity for the selected gear is higher than the current angular velocity.

4. The method of claim 1, wherein:
   displaying the first indicator comprises displaying a first needle on a dial display; and
   displaying the second indicator comprises displaying a second needle on the dial display, the second indicator being visually distinguished from the first needle.

5. The method of claim 4, wherein the filled region is a sector between the first needle and the second needle.

6. The method of claim 1, further comprising:
   refraining from displaying the second indicator in an absence of determining that downshifting of the manual transmission is likely.

7. The method of claim 1, wherein the tachometer is a digital display device.

8. A method comprising, by a controller of a vehicle including an engine:
   detecting that a downshift of a manual transmission of the vehicle is likely; and
   displaying, on a tachometer—
      a first indicator of a current angular velocity of the engine;
      a second indicator of a desired angular velocity; and
      a filled region having a fill corresponding to a difference between the current angular velocity and the desired angular velocity
   wherein detecting that the downshift of the manual transmission of the vehicle is likely comprises:
   detecting both of disengagement of a clutch and pressing of a brake pedal.

9. The method of claim 8, wherein the filled region is an area of the dial display surrounding the first and second needles.

10. A vehicle comprising:
    an engine;
    a manual transmission coupling the engine to one or more road wheels;
    a tachometer display; and
    a controller programmed to:
       detect that a downshift of a manual transmission of the vehicle is likely; and
       render on the tachometer display—
          a first indicator of a current angular velocity of the engine;
          a second indicator of a desired angular velocity; and
          a filled region having a fill corresponding to a difference between the current angular velocity and the desired angular velocity;
    wherein the controller is further programmed to determine a color for the filled region according to the difference between the current angular velocity and the desired angular velocity.

11. The vehicle of claim 10, wherein the controller is further programmed to determine the desired angular velocity of the engine for a lower gear below a current gear of the manual transmission based on a velocity of the vehicle.

12. The vehicle of claim 10, wherein the controller is further programmed to detect that the downshift of the manual transmission of the vehicle is likely by:
    detecting (a) disengagement of the clutch while the manual transmission is in neutral and (b) selection of a selected gear of the manual transmission such that the desired angular velocity for the selected gear is higher than the current angular velocity.

13. The vehicle of claim 10, wherein the controller is further programmed to:
    display the first indicator by displaying a first needle on a dial display; and
    display the second indicator by displaying a second needle on the dial display, the second indicator being visually distinguished from the first needle.

14. The vehicle of claim 13, wherein the filled region is a sector between the first needle and the second needle.

15. The vehicle of claim 10, wherein the controller is further programmed to refrain from displaying the second indicator in an absence of determining that downshifting of the manual transmission is likely.

16. The vehicle of claim 10, wherein the tachometer display is a digital display device.

17. A vehicle comprising:
an engine;
a manual transmission coupling the engine to one or more road wheels;
a tachometer display; and
a controller programmed to:
   detect that a downshift of a manual transmission of the vehicle is likely; and
   render on the tachometer display—
      a first indicator of a current angular velocity of the engine;
      a second indicator of a desired angular velocity; and
      a filled region having a fill corresponding to a difference between the current angular velocity and the desired angular velocity;
wherein the controller is further programmed to detect that the downshift of the manual transmission of the vehicle is likely by:
detecting both of disengagement of a clutch and pressing of a brake pedal.

18. The vehicle of claim 17, wherein the filled region is an area of the dial display surrounding the first and second needles.

* * * * *